US007893647B2

(12) United States Patent
Scherdel et al.

(10) Patent No.: US 7,893,647 B2

(45) Date of Patent: Feb. 22, 2011

(54) ARRANGEMENT FOR DRIVING A LOAD ELEMENT

(75) Inventors: Stefan Scherdel, Markt Schwaben (DE); Manfred Viechter, Walpertskirchen (DE)

(73) Assignee: Oce Printing Systems GmbH, Poing (DE)

( * ) Notice: Subject to any disclaimer, the term of this patent is extended or adjusted under 35 U.S.C. 154(b) by 783 days.

(21) Appl. No.: 11/659,167

(22) PCT Filed: Aug. 8, 2005

(86) PCT No.: PCT/EP2005/008593

§ 371 (c)(1),
(2), (4) Date: Oct. 31, 2007

(87) PCT Pub. No.: WO2006/018175

PCT Pub. Date: Feb. 23, 2006

(65) Prior Publication Data

US 2008/0107435 A1 May 8, 2008

(30) Foreign Application Priority Data

Aug. 11, 2004 (DE) ....................... 10 2004 039 044

(51) Int. Cl.
*H02P 5/74* (2006.01)

(52) U.S. Cl. ........................... 318/685; 318/610; 318/5; 318/45; 318/98

(58) Field of Classification Search ..................... 318/4, 318/5, 8, 9, 40, 45, 48, 51, 53, 85, 86, 98, 318/685, 609, 610; 310/112, 114
See application file for complete search history.

(56) References Cited

U.S. PATENT DOCUMENTS

| | | | | |
|---|---|---|---|---|
| 4,006,982 A | | 2/1977 | Squassoni et al. | |
| 4,373,147 A | * | 2/1983 | Carlson, Jr. | 318/48 |
| 4,686,433 A | * | 8/1987 | Shimizu | 318/50 |
| 4,874,974 A | * | 10/1989 | Wu | 310/112 |
| 5,200,782 A | | 4/1993 | Castelli et al. | |
| 5,608,770 A | | 3/1997 | Noguchi et al. | |
| 5,701,062 A | * | 12/1997 | Barrett | 318/51 |
| 5,962,999 A | * | 10/1999 | Nakamura et al. | 318/432 |
| 6,166,499 A | * | 12/2000 | Kanamori et al. | 318/139 |
| 6,246,856 B1 | | 6/2001 | Kopp et al. | |
| 2002/0114642 A1 | | 8/2002 | Rimai et al. | |

FOREIGN PATENT DOCUMENTS

| | | |
|---|---|---|
| DE | 199 28 366 | 1/2001 |
| EP | 0 693 816 | 1/1996 |
| EP | 0 748 038 | 12/1996 |
| JP | 61-62386 A | 3/1986 |
| JP | 11095503 | 4/1999 |
| WO | WO 98/39691 | 9/1998 |

* cited by examiner

*Primary Examiner*—Bentsu Ro
(74) *Attorney, Agent, or Firm*—Schiff Hardin LLP

(57) ABSTRACT

In a method or system for driving a load element, a drive motor is provided on a drive shaft of the load element that establishes a drive rotation speed of the load element. A rotation torque sensor on the drive shaft emits a load torque signal proportional to a rotation torque. A rotation torque influencing device generates a supplementary torque when the load torque signal deviates from a desired load angle value present when a change has not occurred to a load created by the load element and acting on the drive motor, the supplementary torque being added to a drive torque generated by the drive motor such that a load angle of the drive motor remains substantially constant and uninfluenced by a change of the load.

13 Claims, 9 Drawing Sheets

ARRANGEMENT FOR DRIVING A LOAD ELEMENT

BACKGROUND

The general requirement to realize a drive that exhibits an extremely low position deviation given load fluctuations and thus behaves rigidly can be of importance in different usage cases. An important example is provided in electrographic printing or copying devices in which a plurality of drive elements must run with high uniformity because fluctuations in the drive lead to a position error in the print product, in particular in color printing. An example results from WO 98/39691 A1, which is included in the disclosure. There a printing or copying device is described with which color printing is possible. Here the individual color separations are collected on a transfer belt in the color collection mode. When all color separations for the print image are collected, the recording medium (for example a paper) is pivoted onto the transfer belt and the print image is transfer printed. It is then simultaneously begun to collect the next color separations on the transfer belt. Since the recording medium and the transfer belt do not exhibit the same surface speed, after the pivoting of the transfer belt between recording medium and transfer belt a force develops that leads to a change of the drive torque of the transfer belt. The force (and thus the torque change) is determined and limited by the contact force of the transfer belt on the recording medium and the friction coefficient between them.

Due to the change of the load torque while the recording medium is pivoted onto the transfer belt, the load angle of the drive motor for the transfer belt also changes, whereby this chases after its desired position (desired position: position at which the transfer belt would be if the recording medium had not been pivoted onto the transfer belt). An offset of the color separations transferred from the intermediate image carrier (for example a photoconductor belt) onto the transfer belt thereby results while the transfer belt is pivoted onto the recording medium to which color separations are transfer-printed from the intermediate image carrier onto the transfer belt is the transfer belt is pivoted away from the recording medium. The offset can amount to approximately 100 μm. The drive torque can thereby change by 1 Nm to 5 Nm.

Upon pivoting of the transfer belt away from the recording medium the force transferred between the recording medium and the transfer belt is abruptly removed. The drive torque for the transfer belt thereby also changes suddenly, whereby on the one hand the transfer belt again runs with the original load angle and on the other hand the transfer belt is shifted into oscillations. Both effects cause a displacement of the color separations. The amplitude of the oscillation can amount to approximately +/−100 μm.

It is an object to specify an arrangement in which the load angle of the drive moment is kept constant in spite of alteration of the driven load.

In a method or system for driving a load element, a drive motor is provided on a drive shaft of the load element that establishes a drive rotation speed of the load element. A rotation torque sensor on the drive shaft emits a load torque signal proportional to a rotation torque. A rotation torque influencing device generates a supplementary torque when the load torque signal deviates from a desired load angle value present when a change has not occurred to a load created by the load element and acting on the drive motor, the supplementary torque being added to a drive torque generated by the drive motor such that a load angle of the drive motor remains substantially constant and uninfluenced by a change of the load.

DESCRIPTION OF THE PREFERRED EMBODIMENTS

Figure 1:
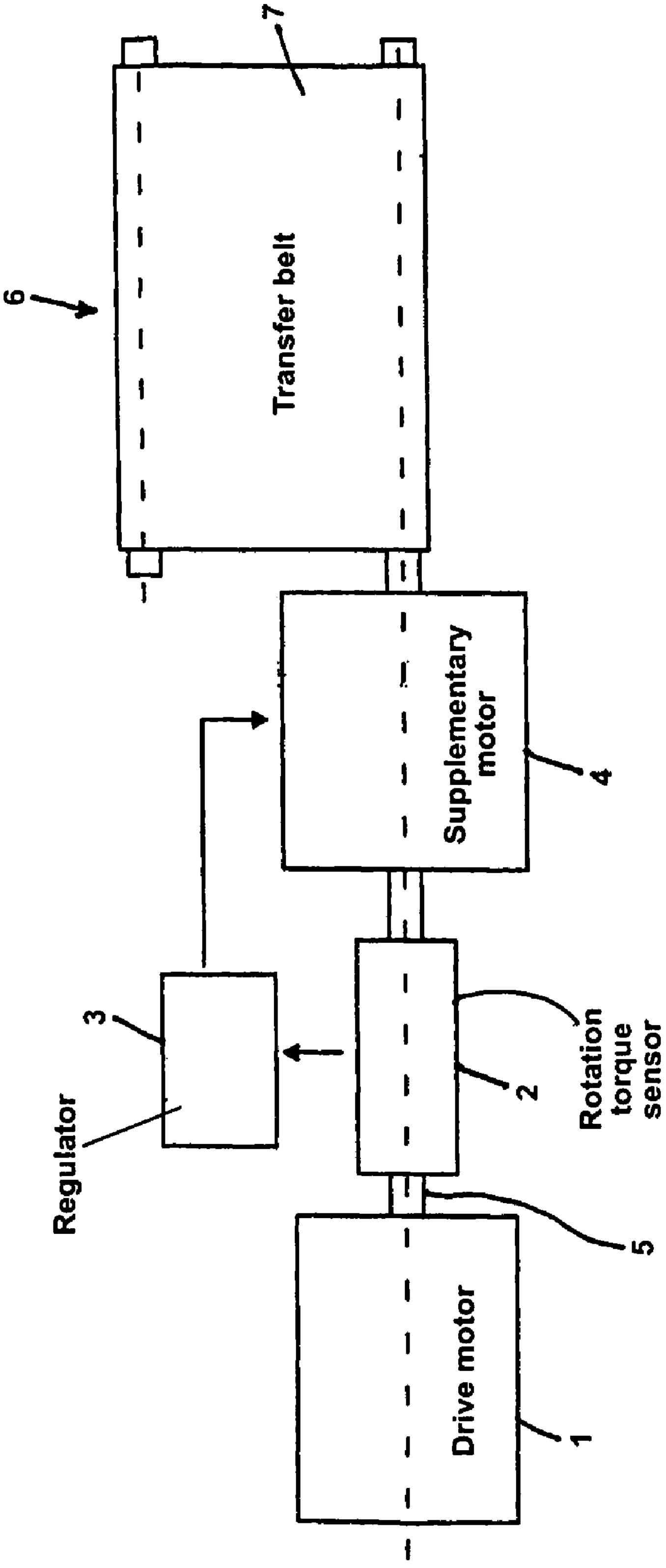
FIG. 1 is a first exemplary embodiment in which a rotation torque influencing device comprises a supplementary motor that is regulated.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

to keep the load angle constant, to minimize the oscillation of the load element, to counteract causes for disruptions in the course of the load element as early as possible, to use prevalent drive components.

The measurement device can be a rotation torque sensor that measures as measurement values the load torques incurred on the drive shaft by the load element. The load angle deviation can be determined from the measured load torque without load change (desired value) and the load torque given load change (torque deviation).

Since in operation the desired value does not change, a one-time establishment of the desired load torque value is sufficient.

Given presence of a load change a supplementary torque can be generated with the rotation torque influencing device supplementary torque being added to the torque generated by the drive motor. The load angle of the drive motor is then not influenced by the load change.

A supplementary motor that generates the supplementary torque via which the torque deviation caused by the change of the load is compensated can be used as a rotation torque influencing device. A brushless direct current motor or a servomotor can be provided as a supplementary motor. The supplementary motor generates a constant basic torque and a variable torque that results due to the load change at the load element. The drive motor must only still raise the drive rotation speed and a small, constant residual torque.

The size of the supplementary torque to be applied by the supplementary motor is established via the rotation torque sensor. The supplementary motor is regulated or controlled depending on the installation location of the rotation torque sensor.

Advantages of the arrangement with supplementary motor are to be seen in the following:

The drive motor determines the rotation speed of the load element and contributes only a small part to the drive torque, which part is constant. The rotation speed fluctuations are thereby kept extremely small since the drive motor is not influenced by a load change.

Since it does not wait until a rotation torque change is integrated into a measurable position change of the load element, the preferred embodiment operates with a shorter reaction time than a regulation that uses a position deviation signal as a measurement quantity.

Since the drive motor is operated with the same load, the load angle also remains constant. Since no load change acts on the drive motor, no fluctuations are also excited.

The drive motor (for example a step motor) can be designed for smaller capacity since the supplementary motor applies the largest portion of the drive torque.

The arrangement can be realized such that the supplementary motor is arranged on the drive shaft in addition to the drive motor, the rotation torque sensor is arranged between drive motor and supplementary motor, a regulator connected with the rotation torque sensor is provided that regulates the supplementary motor dependent on the torque deviation such that the load acting on the drive motor remains constant.

The arrangement can also be designed such that the supplementary motor is arranged adjacent to the drive motor on the drive shaft, the rotation torque sensor is arranged between the supplementary motor and the load element, a controller is provided to which the torque signal is supplied and which controls the supplementary motor dependent on the torque deviation such that the load acting on the drive motor remains constant.

The arrangement can furthermore be designed such that the supplementary motor is arranged on a further shaft around which the load element is deflected, the rotation torque sensor and the drive motor are arranged on the drive shaft, the torque signal is supplied to a regulator that regulates the supplementary motor dependent on the torque deviation such that the load acting on the drive motor remains constant.

The rotation torque influencing device can be a brake that exerts a braking torque on the drive shaft dependent on the torque deviation, via which braking torque the torque deviation is compensated. The brake can, for example, be an eddy current brake. Here as well the drive motor determines the rotation speed of the load element and applies a constant rotation torque. The rotation speed fluctuations are thereby kept extremely small since the drive motor perceives no load change.

Further advantages are:

Since it is not waited until a rotation torque change is integrated into a measurable position change of the load element, here the preferred embodiment also operates with a shorter reaction time than a regulation that uses a position deviation signal as a measurement quantity.

The load angle also remains constant since the drive motor is always operated with the same load.

Since no load changes act on the drive motor, no fluctuations are also induced.

A brake is additionally cheaper than a motor (for example a direct current motor).

Given use of a brake, the arrangement can be designed such that the brake is arranged on the drive shaft in addition to the drive motor, the rotation torque sensor is arranged between drive motor and brake, a regulator connected with the rotation torque sensor is provided that regulates the brake dependent on the torque deviation such that the load acting on the drive motor remains constant.

The arrangement of the preferred embodiment can also be realized such that the brake on the drive shaft is arranged adjacent to the drive motor, the rotation torque sensor is arranged between brake and load element, a controller is provided to which the torque signal is supplied and which controls the brake dependent on the torque deviation such that the load acting on the drive motor remains constant.

Finally, the brake can also be arranged on a further shaft that deflects the load element.

The load element can, for example, be a belt that is driven by the drive motor and which is deflected by a further shaft.

If the drive motor is a step motor, the phase position of the driving magnetic field for the motor shaft of the step motor can be influenced with regard to the position of the motor shaft such that the measured position of the motor shaft remains constant relative to the desired position of the motor shaft (position without load change) even when the load for the motor changes.

In a first realization of this principle, the characteristic of the torque-phase angle characteristic line can be used to control the phase position of the magnetic field of the step motor.

In a second realization, the actual deviation from the desired position can be used as an input value for a regulator with which the phase position of the magnetic field can be regulated with regard to the motor shaft.

In both realizations the step motor is not operated with a fixed activation frequency for the motor currents; rather the activation frequency is adapted dependent on the load.

In the first realization the measurement device can be a rotation torque sensor that: measures the load torque; supplies the measurement values to the rotation torque influencing device that determines the change of the load torque caused by the load change; determines from the torque-phase angle characteristic line the phase angle change associated with the change of the load torque; and initiates the control of the activation frequency of the step motor dependent on this change of the load torque. The rotation torque sensor can thereby be arranged between the step motor and the load element on the drive shaft for the load element.

In the second realization the measurement device can be a rotation sensor that generates rotation sensor pulses as measurement values dependent on the rotation movement of the drive shaft and supplies rotation sensor pulses to the rotation torque influencing device that determines the time between the rotation sensor pulses and compares this time with the time without load change and, with the comparison result, regulates the activation frequency of the step motor. The rotation sensor can thus be arranged on the drive shaft and the step motor can thus lie between the rotation sensor and the load element.

The rotation torque influencing device can be a microprocessor that is programmed such that it operates as a PID regulator. From the measurement values this microprocessor generates clock signals for the motor controller which derives the activation pulses for the motor currents to be fed to the step motor from these clock signals.

The arrangement of the preferred embodiment can advantageously be used in an electrographic printing or copying device in which charge images of images to be printed are generated on an intermediate image carrier, which images to be printed are transferred onto a transfer belt after development and are then transfer-printed onto a recording medium. Here the load element can be the transfer belt that is driven by an arrangement according to the preferred embodiment. The supplementary motor or the brake can then be arranged on the drive shaft for the transfer belt or on a shaft that lies at the transfer printing point of the recording medium and the transfer belt.

The is preferred embodiments are further explained using the drawing Figures. A transfer belt of an electrographic printing or copying device according to WO 98/39691 A1 is drawn upon as an example of a load element without the preferred embodiments being limited to the application case.

According to FIG. 1, a first exemplary embodiment of the system comprises a drive motor 1, a rotation torque sensor 2, a regulator 3 and a supplementary motor regulated by regulator 3 as the rotation torque influencing device. The drive motor 1 can be a step motor, the rotation torque sensor 2 can be of typical design, and the regulator 3 can be a PID regulator. The drive motor 1 is arranged on a drive shaft 5 via which a load element 6 is driven. In the exemplary embodiment of FIG. 1 a transfer belt 7 of an electrographic printing or copying device has been used as an example for the load element 6. The supplementary motor 4 (for example a direct current motor or a servomotor) lies on the drive shaft 5; and the rotation torque sensor 2 is arranged between the drive motor 1 and the supplementary motor 4. The rotation torque sensor 2 emits a torque signal proportional to the rotation torque on the drive shaft 5, which torque signal is supplied to the regulator 3 and compared by this with a desired signal associated with the rotation torque without load change. With the comparison signal the supplementary motor 4 is activated such that it compensates the load change, with the result that the load that must be applied by the drive motor 1, and thus the load angle of the drive motor 1 does not change.

It is a goal of the design to keep constant the rotation torque that the drive motor 1 must apply to drive the transfer belt 7. If this is the case then the load angle of the drive motor does not change. The majority of the drive torque and drive torque fluctuations are therefore generated by the supplementary motor 4. The drive motor 1 thus only still determines the rotation speed of the transfer belt 7 and contributes only a small portion to the drive torque, which portion is however constant. In order to achieve this the rotation torque sensor 2 measures the rotation torque that must be applied by the drive motor 1. The regulator 3 readjusts the operating voltage of the supplementary motor 4 such that the measured rotation torque is kept to a previously-set rotation torque (desired torque).

Since it does not wait until a rotation torque change is integrated into a measurable position change of the transfer belt 7, the arrangement operates with a shorter reaction time than a regulation that uses a position signal as a measurement quantity. Furthermore, since the drive motor 1 is always operated with the same load, the load angle also remains constant and, since no load changes act on the drive motor 1, no oscillations of the transfer belt 7 are induced as well.

Figure 2:
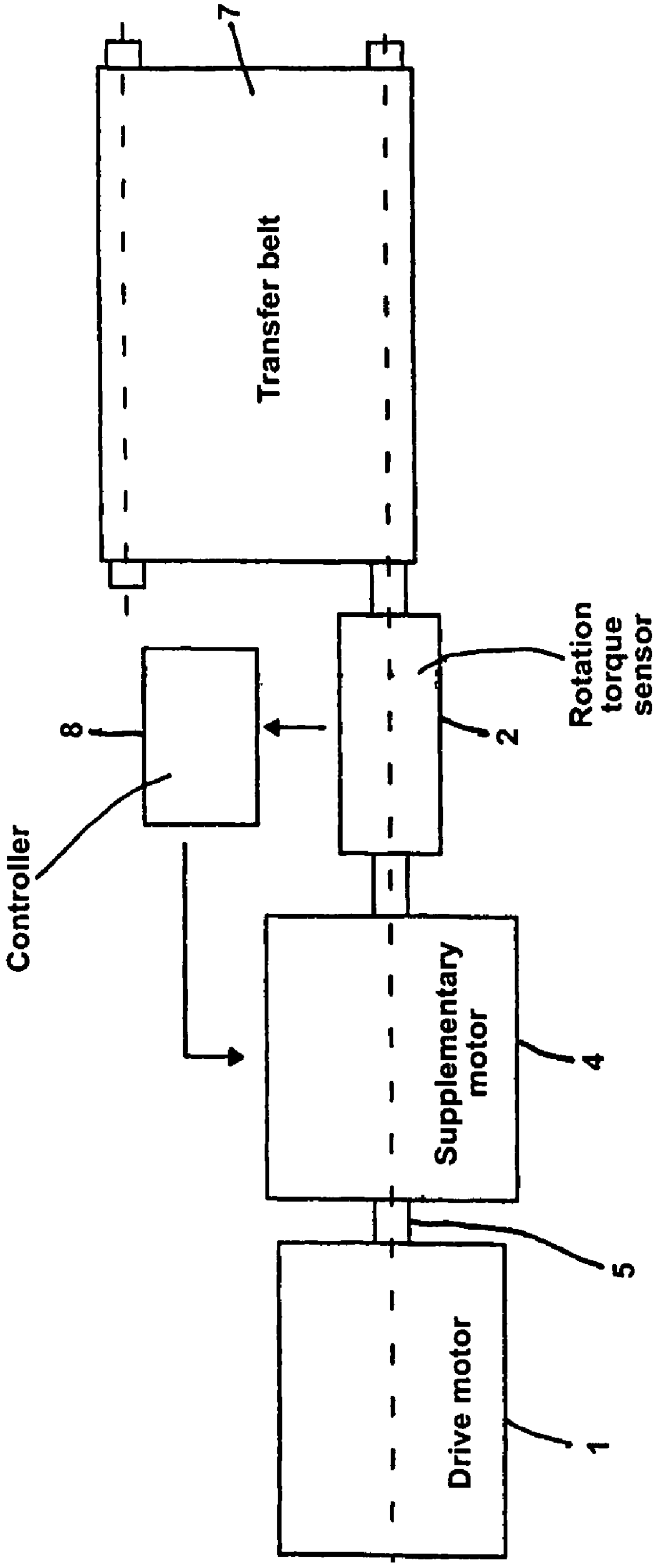
FIG. 2 is a second exemplary embodiment in which the rotation torque influencing device comprises a supplementary motor that is controlled.

FIG. 2 shows a second exemplary embodiment in which a controller 8 is employed instead of a regulator; the other units are used corresponding to FIG. 1. The arrangement according to FIG. 2 thus provides a rotation torque sensor 2, a supplementary motor 4, a drive motor 1 and a controller 8. The drive motor 1 is in turn arranged on the drive shaft 5 by which the transfer belt 7 is also driven. The rotation torque sensor 2 lies between supplementary motor 4 and transfer belt 7. The torque signal emitted by the rotation torque sensor 2 is supplied to the controller 8 which compares this signal with a desired signal and, dependent on the comparison, activates the supplementary motor 4 such that the load angle of the drive motor 1 remains constant.

In comparison to FIG. 1, the arrangement according to FIG. 2 operates according to the controller principle. The controller 8 adjusts the operating voltage of the supplementary motor 4 such that the drive motor 1 must only still apply the previously-set constant rotation torque that the drive motor 1 should contribute to the drive. The supplementary motor 4 generates the remainder of the drive moment. The same advantages as in FIG. 1 result, only instead of a regulation a controller is used. The voltage-rotation torque characteristic of the supplementary motor 4 must in fact be known in order to keep the rotation torque constant for the drive motor 1; fluctuation problems that could be caused by a disadvantageously set regulator 3 are therefore avoided.

Figure 3:
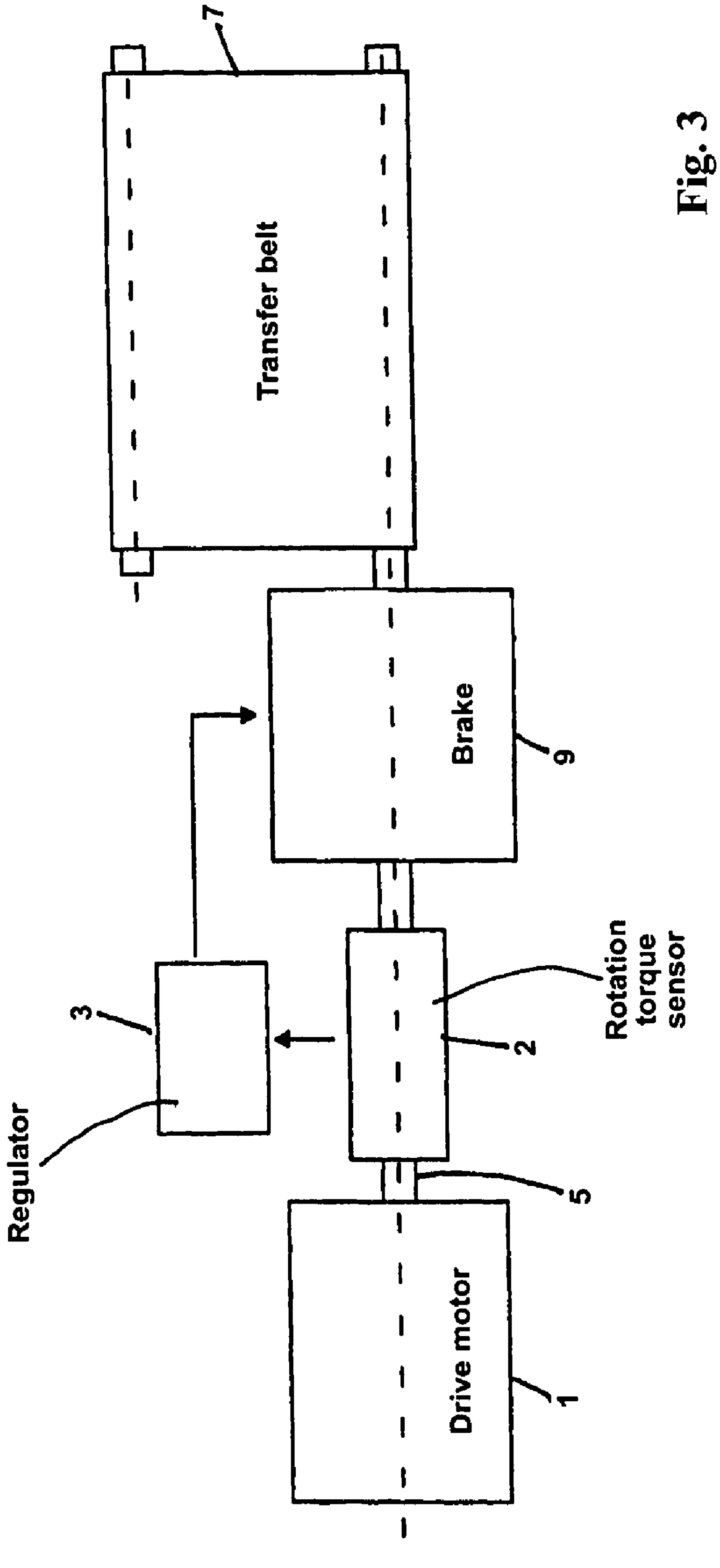
FIG. 3 is a third exemplary embodiment in which a load element is a belt and the rotation torque influencing device comprises a brake that is regulated.

In the third exemplary embodiment according to FIG. 3, a brake 9 (for example an eddy current brake) is used as a means influencing the rotation torque. The brake 9 is arranged on the drive shaft 5 for the transfer belt 7; furthermore, the drive motor 1, the rotation torque sensor 2 and a regulator 3 are provided in turn. The brake 9 lies between rotation torque sensor 2 and transfer belt 7 and is activated by the regulator 3 that receives the torque signal from the rotation torque sensor 2 arranged between drive motor 1 and brake 9. The regulator compares the torque signal with a desired value and regulates the brake 9 such that the load angle of the drive motor 1 does not change. For this the regulator 3 readjusts the control voltage of the brake 9 such that the measured rotation torque is held at the desired value. The desired value is here the maximum rotation torque that occurs in the operation of the transfer belt 7. When a torque change arises, the brake 9 is activated and a braking torque is applied to the drive shaft 5. In comparison to FIG. 1 or FIG. 2, here the drive motor 1 must thus apply a greater rotation torque that is braked downward to the drive torque (corresponding desired value) of the transfer belt 7.

The same advantages as in FIG. 1 result. The drive motor 1 must merely apply a higher rotation torque since the drive shaft 5 is braked given a torque deviation. Thus the rotation speed of the drive shaft 5 is braked down to the rotation speed corresponding to the desired value. It is advantageous relative to FIG. 1 that a brake is cheaper than a motor and that an eddy current brake generates a very uniform braking torque. Moreover, a damping of the oscillation-capable system drive motor-transfer belt is achieved via the brake, whereby oscillations exhibit a smaller amplitude and decay faster.

Figure 4:
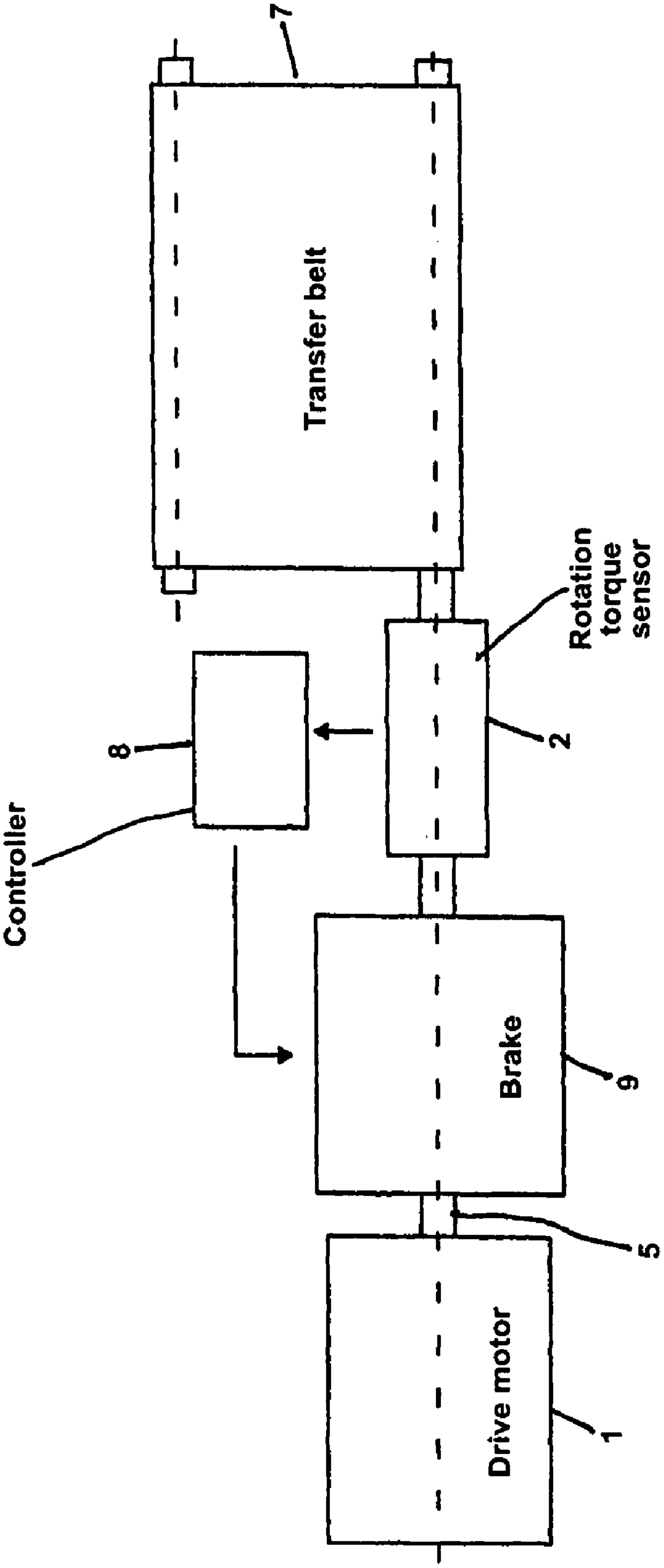
FIG. 4 is a fourth exemplary embodiment in which the load element is a belt and the rotation torque influencing device comprises a brake that is controlled.

FIG. 4 (fourth exemplary embodiment) differs from FIG. 3 only in that the regulator 3 has been replaced by a controller 8. Thus the brake 9 is arranged between drive motor 1 and rotation torque sensor 2.

It is again the goal of the design according to FIG. 4 to keep constant the rotation torque that the drive motor 1 must apply to drive the transfer belt 7 in spite of load change. In order to achieve this, the rotation torque sensor 2 measures the rotation torque that must be applied for the driving of the transfer belt 7. The controller readjusts the control voltage of the brake 9 such that the measured rotation torque together with the braking torque of the brake 9 is kept at a previously-set value. This is the maximum rotation torque (desired value) that occurs in the operation of the transfer belt 7. The advantages correspond to those that were mentioned in FIG. 3 except that the oscillations caused by a disadvantageously-set regulator are avoided.

Figure 5:
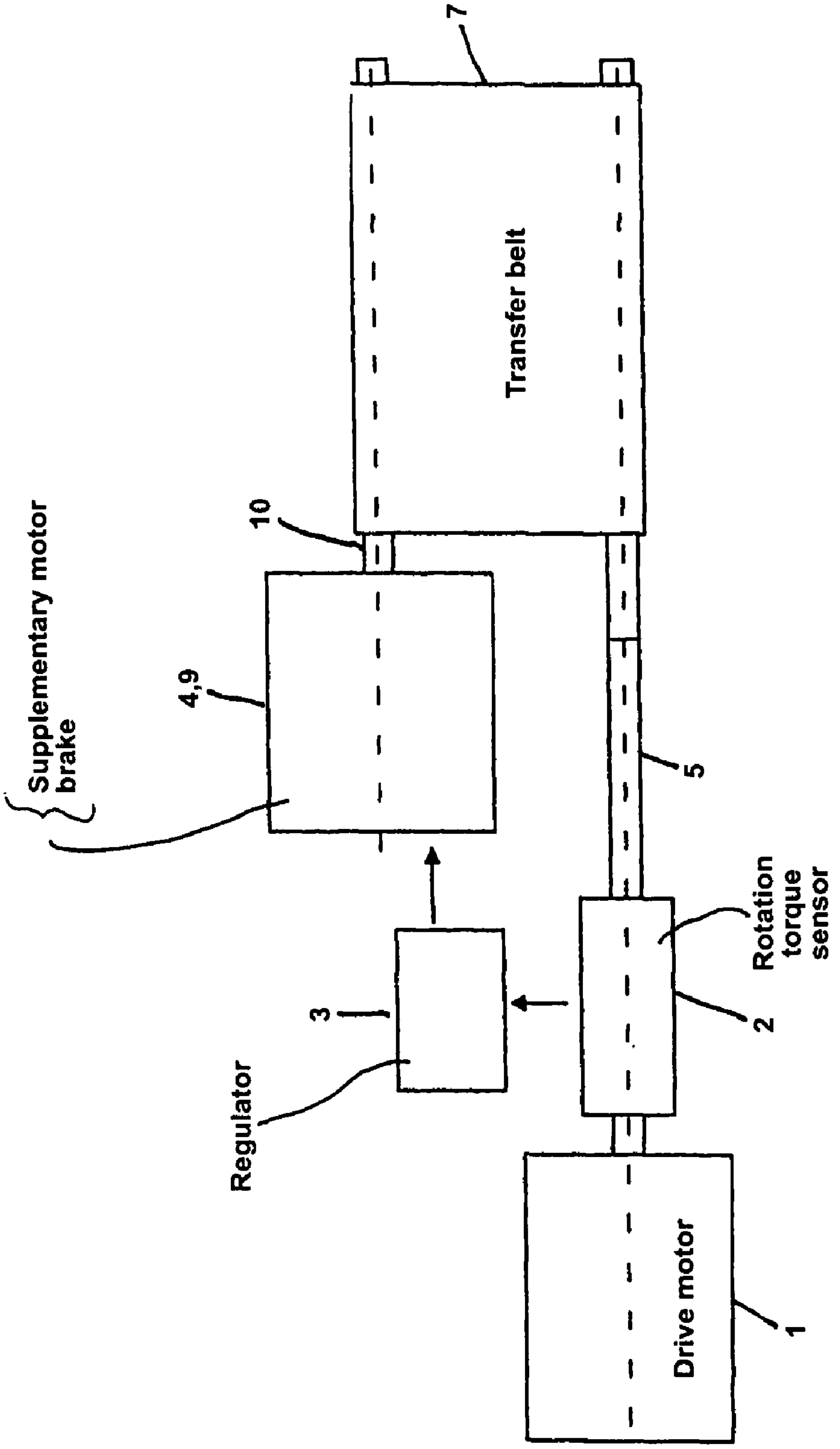
FIG. 5 is a fifth exemplary embodiment in which the rotation torque influencing device comprises a supplementary motor or a brake that is arranged on a deflection shaft for the belt and is regulated.

A fifth exemplary embodiment results from FIG. 5. Here the supplementary motor 4 or the brake 9 are arranged on a deflection shaft 10 of the transfer belt 7, most appropriately on the deflection shaft on which the largest torque changes occur. In a printer this is the shaft of the transfer belt 7 at which the recording medium is transfer-printed. The drive motor 1 and the rotation torque sensor 2 remain on the drive shaft 5; furthermore, a regulator 3 is provided.

Via the arrangement according to FIG. 5 it is prevented that the torque change due to a recording medium pivoted towards the transfer belt 7 leads to a tension change in the transfer belt 7, meaning that the expansion of the transfer belt 7 does not change due to the recording medium being pivoted onto it.

In sixth and seventh exemplary embodiments, given a step motor for compensation of the load change (and the load angle change thereby incurred) the phase position of the magnetic field driving the motor shaft of the step motor is influenced with regard to the position of the motor shaft.

If the load changes given a step motor, the phase position of the magnetic field of the motor thus changes with regard to the position of the motor shaft. Speed fluctuations are thereby caused. It is a goal of the preferred embodiments to react to changes of the load torque such that they do not lead to a change of the phase position of the motor shaft of the step motor relative to its desired position (phase position without load change).

Figure 6:
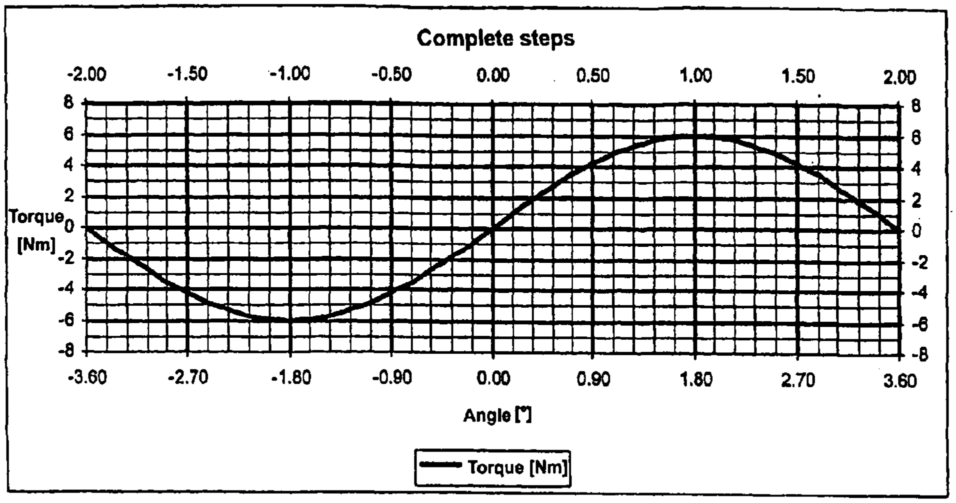
FIG. 6 shows a torque phase angle characteristic line of a step motor.

In a sixth exemplary embodiment, given a step motor fed with current at a standstill, the torque that is necessary for deflection of the motor shaft from the zero position is to be approximately described by a sinusoidal function (see FIG. 6).

In the rest position the torque is zero. The maximum torque (holding torque of the motor) occurs when the motor shaft is, for instance, deflected by a full step from the rest position; after two full steps the torque is again at zero, as in the rest position. The torque curve first repeats after 4 full steps. Given a stable operation of the step motor, the deviation of the position of the motor shaft from the desired position can thus at maximum amount to +/−1 full steps. For safety reasons, the actual usable range is clearly smaller. Dependent on the load, a fixed phase angle $\phi$ arises that can be determined for each motor. The phase angle $\phi$ is thus the angle between the position of the motor shaft and the position of the magnetic field of the step motor.

The same considerations apply for a rotating step motor, only with the difference that the level of the maximum torque that can be delivered decreases with increasing rotation speed of the step motor since the friction in the step motor is greater on the one hand; on the other hand, given rising rotation speed the current that produces the driving magnetic field can no longer be injected into the motor coils due to the inductivity.

In spite of this, for every motor the characteristic line "Torque M over deflection $\phi$" can be experimentally determined for each motor current and each rotation speed.

If the load torque is now determined with the rotation torque sensor 14 (see FIG. 7), it can be learned from the characteristic line field by which phase angle range $\Delta\phi$ the position of the motor shaft deviates from the desired position when the torque changes by the magnitude $\Delta M$. If this value is known, the position of the magnetic field of the step motor can be corrected by this angle $\Delta\phi$ via the motor activation. Without correction of the phase angle, the real position of the motor shaft would vary relative to the desired position given a load torque change $\Delta M$. Due to the phase angle correction a new equilibrium state arises without the motor shaft being temporarily slower or faster. Since the magnetic field of the step motor can be adjusted without delay, a regulation of the phase angle $\phi$ of the magnetic field reacts without delay to load torque changes $\Delta M$.

A step motor so activated maintains the phase angle that exists at the desired position of the motor shaft, even at its real position, even when the load torque changes, since the phase angle between desired position of the motor shaft and position of the magnetic field is controlled dependent on the load.

Figure 7:
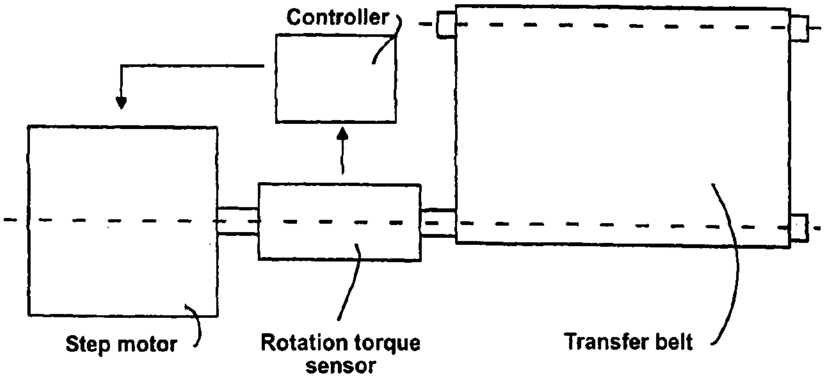
FIG. 7 is a sixth exemplary embodiment in which a torque sensor is used as a measurement device and in which a phase angle of the step motor is controlled.

FIG. 7 shows an arrangement for correction of the phase position. A step motor 11 is arranged with its motor shaft on a drive shaft 12. A rotation torque sensor 14 is provided between the step motor 11 and a load element 13. The rotation torque sensor 14 operates as a measurement device that emits as measurement values the load torques that the load element 13 exerts on the drive shaft 12. These are supplied to the controller 14 that, from the torque-phase angle characteristic line with the load torque change $\Delta M$, determines the phase angle change $\Delta\phi$ by which the position of the magnetic field of the step motor 11 (which magnetic field drives the motor shaft) must be corrected in order to retain this desired position.

Figure 8:
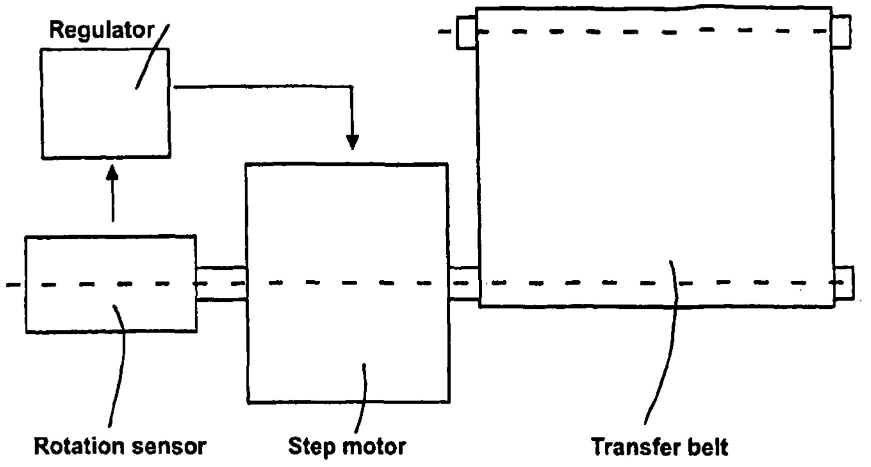
FIG. 8 is a seventh exemplary embodiment in which a rotation sensor is used as a measurement device and in which the phase angle of the step motor is regulated.

In a seventh exemplary embodiment, a rotation sensor 16 is used for determination of the position of the motor shaft (see FIG. 8). The signal of the rotation sensor 16 is then used for a regulation of the phase position of the magnetic field relative to the position of the step motor shaft.

In the realization according to the seventh exemplary embodiment, the pulses of the rotation sensor 16 are not counted; rather the time between the rotation sensor pulses is measured and added up. One therefore obtains not the position of the motor shaft at specific time intervals but rather the time (in fixed angle intervals) at which the motor shaft has reached the desired position.

The method is only usable for a rotating motor due to the time measurement between two angle positions; a position regulation given a standstill is not possible. The regulation occurs according to the following. How long the respective time interval would have to be between two rotation sensor pulses in an ideal manner is known by the motor controller. If the actual measured time interval is subtracted from this desired interval, one knows by which $\Delta t$ the respective time interval has deviated from the desired interval. If one adds up the deviations up to the current point in time, one receives the time by which the motor shaft was too early or too late at the location at which the last measurement was implemented. Since the temporal deviation of the motor shaft position from the desired position is now known, the motor activation of the step motor can be influenced via a regulation such that the deviation goes towards zero.

The temporal resolution of the measurement now depends only on the precision of the rotation sensor 16 and the precision of the time measurement, however not on the resolution of the rotation sensor 16. Since rotation sensors 16 can be very precisely produced with simple a device and time measurements with microprocessors can realize resolutions of far less than 1 μs, a very precise determination of the deviation of the real motor shaft position from its desired position is possible.

Via this method the phase angle that was present upon activation of the regulation is also regulated.

Figure 9:
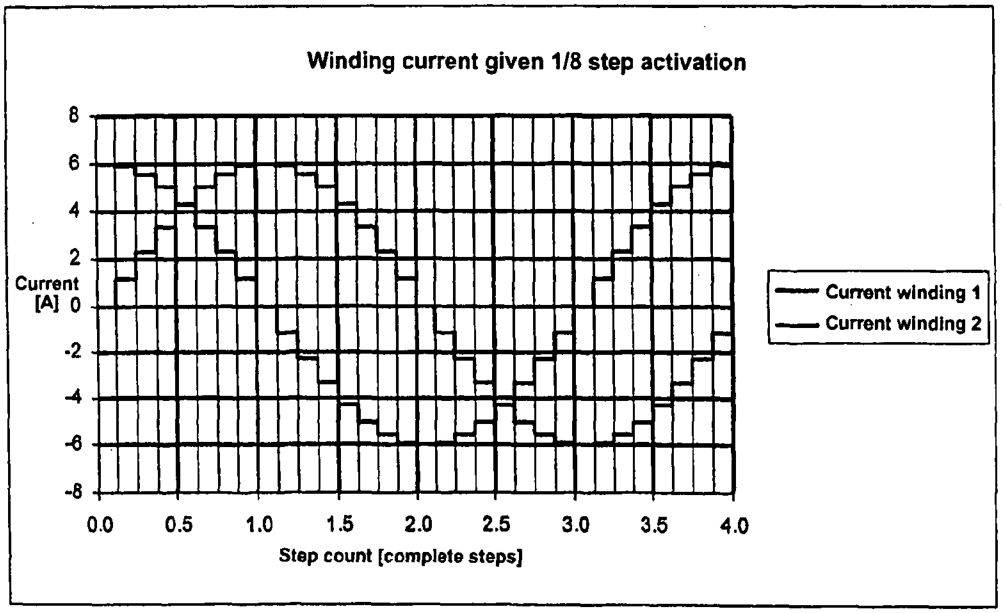
FIG. 9 shows a motor current characteristic line for a step motor.

The regulation given constant rotation speed in connection with FIG. 8 is described in the following. The motor controller (see FIG. 12) initially supplies the activation pulses for the step motor 11 without position regulation. For this the currents I1, I2 of the motor windings of the step motor 11 are sinusoidally varied in fixed time intervals, whereby the currents exhibit a phase offset of 90° (see FIG. 9). The motor currents I1 and I2 for four complete steps are shown in FIG. 9.

The pattern of the current curve repeats every 4 complete steps. If the position regulation is now switched on, a microprocessor additionally measures the time interval between two rotation sensor pulses ($\Delta T_{rotation\ sensor}$) that in this case should ideally be equal to the time interval of a half step (ΔT) (see FIG. 10). If, for example, a rotation sensor is used that delivers 400 pulses/rotation, this corresponds to one pulse/half step given a step motor with a 1.8° step angle.

Figure 10:
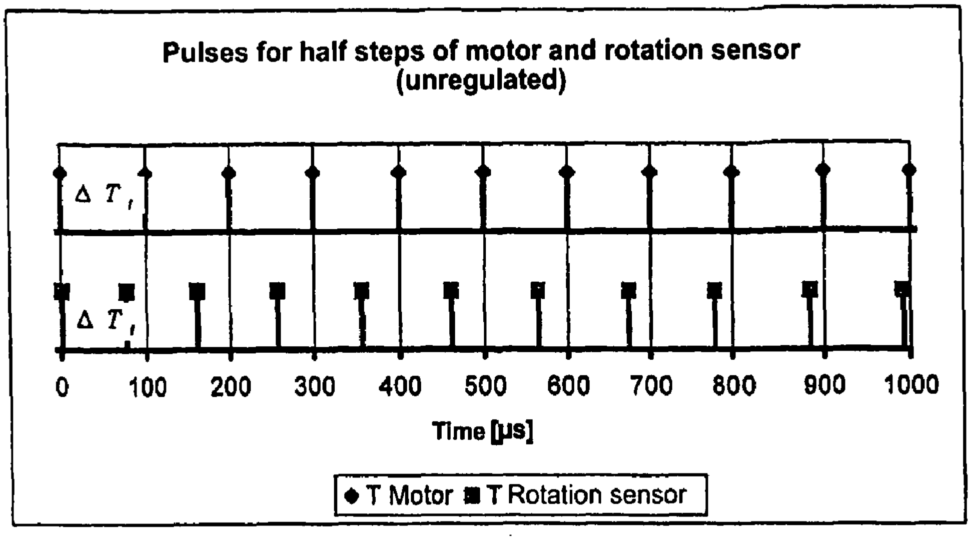
FIG. 10 shows activation pulses for the step motor and associated rotation sensor pulses given an unregulated step motor.

In the first row FIG. 10 shows the activation pulses $IM_M$ that the motor controller uses for the switching of the motor currents I of the step motor 11 for the unregulated operation. The activation pulses $IM_M$ have a time interval of $\Delta T_{motor}$. The rotation sensor pulses $IM_D$ emitted by the rotation sensor 16 are shown in the second row. These exhibit varying time intervals $\Delta T_{rotation\ sensor}$. It is to be recognized that the rotation sensor pulses $IM_D$ do not run in sync with the activation pulses $IM_M$ but rather run after the activation pulses $IM_M$ dependent on the change of the load.

Figure 11:
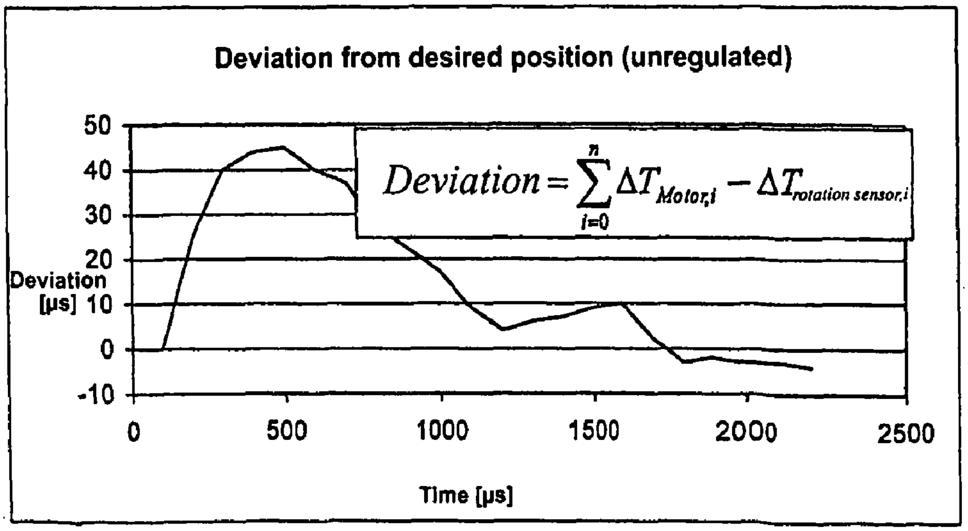
FIG. 11 illustrates a curve of a temporal deviation of the activation pulses from rotation sensor pulses given an unregulated step motor according to FIG. 10.

The difference from desired duration for a half-step and the measurement value are now established and the result is added up. The summation begins upon activation of the regulation with the value 0. The summand specifies by which Δt the motor shaft is too early or too late at the desired position (see FIG. 11). In FIG. 11 the deviation of the real position from the desired position is represented in μs given operation with regulation. The pulses IM follow one another in half-steps.

The step duration of the next steps of the step motor 11 can be shortened or extended with this value such that the temporal deviation of the real position from the desired position is optimally small.

As an alternative to the variation of the step duration, the access to the motor current table (FIG. 9) in which the curve progression of the motor currents I is contained in tabular form can be adjusted. From this table the motor controller reads which motor current I should be used for the next step. For this a pointer to the table value is incremented or decremented at fixed timer intervals depending on the running direction of the motor. Given a fixed motor rotation speed, the interval of two table values can be associated with a fixed time interval. For the regulation the value for the time correction can thus be added to the pointer of the motor current table such that the frequency of the activation pulses AM can be adjusted.

An arrangement for the seventh exemplary embodiment is to be learned from FIG. 8. The rotation sensor 16 is arranged on the drive shaft of the load element 13. The step motor 11 with its motor shaft lies between rotation sensor and load element 13. The rotation sensor 16 measures the movement of the drive shaft 12 and relays the measurement values to the device that is realized in FIG. 8 as a regulator 17. Dependent on the measurement values, the regulator 17 generates clock signals for the motor controller of the step motor 11 that adjusts the activation pulses for the motor currents I of the step motor corresponding to the above method.

Among other things, a normal PID regulator or even a regulator with fuzzy logic can be used for the regulation. It is additionally possible to filter out specific frequencies from the regulator input signal (measurement values) in order to avoid resonances.

Given use of a PID regulator, the following properties result:

The deviation of the real position of the motor shaft relative to its desired position is regulated via the P-portion of the regulation.

The remaining regulation difference can be regulated to zero via the I-portion of the regulation.

Eigenfrequencies of the system are attenuated via the D-portion (the feed rate is proportional to the location change per time unit, i.e. is equal to $\dot{\phi}$ in the movement equation for an attenuated, fluctuation-capable system $J\ddot{\phi}+\beta\dot{\phi}+D\phi=0$ with β as an attenuation constant).

The described method exhibits the following properties:

It can also be carried over to non-constant rotation speeds.

If the time measurement of the rotation sensor intervals is implemented by the same microprocessor as the activation of the motor, no errors can be added due to different quartz frequencies (production tolerances).

For the motor controller it is simpler to realize a position regulation on the basis of temporal deviations as spatial deviations since the activation of the motor windings is likewise temporally controlled.

Given evaluation of all edges of the rotation sensor signals, a regulation that is 4 times faster can be realized with the same rotation sensor. A measurement value for the deviation from the desired position then exists at each eighth of a step.

Other rotation sensor resolutions can also be worked with, however, whereby it is advantageous when the resolution of the rotation sensor is a whole-number multiple of the steps/rotation of the step motor or vice versa.

The rotation sensor does not have to be mounted on the motor shaft. If the sensor is mounted on a different shaft of the load element, the position of this shaft is thus regulated. If this shaft does not run with the same rotation speed as the motor shaft, however, a conversion factor is to be taken into account.

Figure 12:
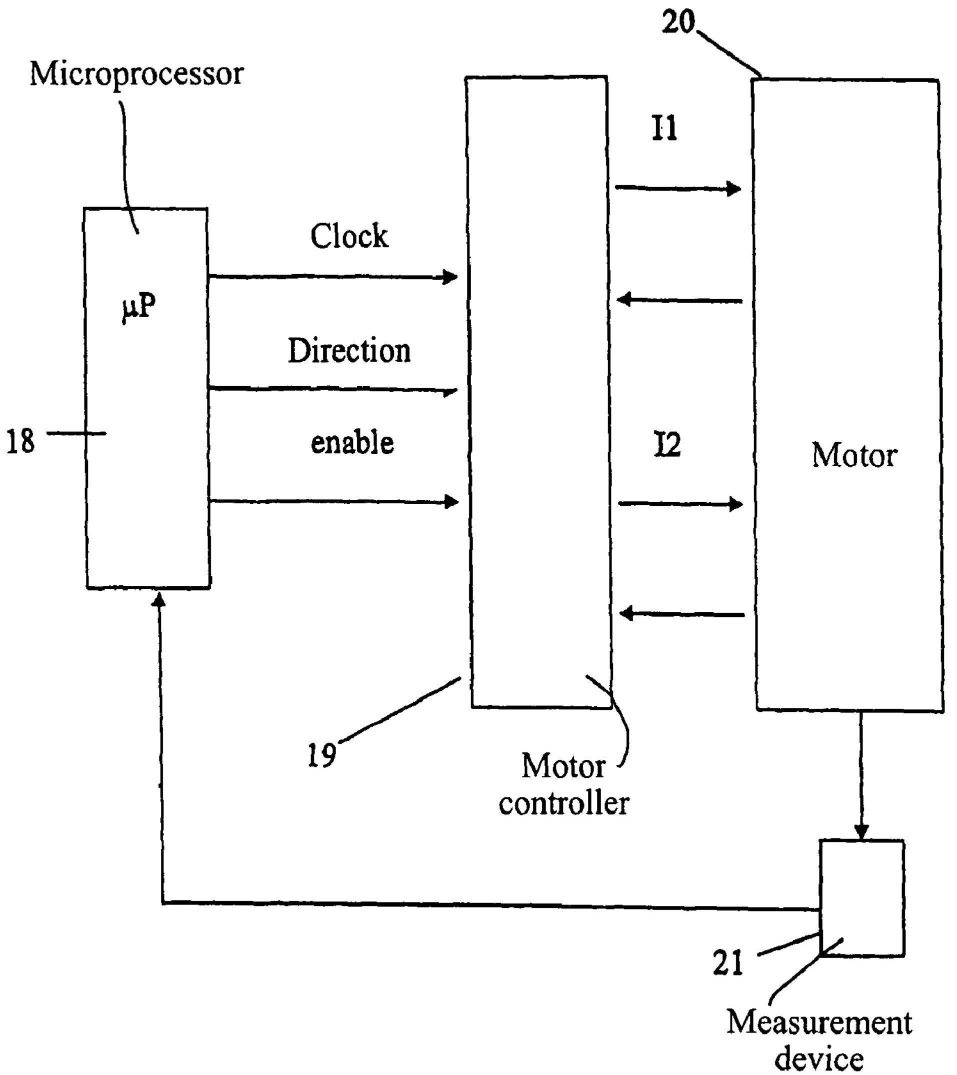
FIG. 12 is a block diagram of the arrangement.

FIG. 12 shows a block diagram of the arrangement that can be used for all exemplary embodiments. The measurement values (for example load torque signals) that are supplied to a microprocessor 18 (as the rotation torque influencing device) can be derived with the measurement device 21 from the motor shaft of a motor 20. According to the method described above with regard to the exemplary embodiments, dependent on the measurement values, the microprocessor 18 generates the signals that are supplied to a motor controller of typical design and possibly to a supplementary motor or break and there are used in order to correspondingly adjust the motor controller 19. When, for example, the seventh exemplary embodiment is used, clock signals, a direction signal, and an enable signal are supplied to the motor controller 19. Dependent on the clock signals, the motor controller 19 generates the activation pulses for the motor controllers I for the step 20 such that the phase position of the step motor is maintained in spite of a change of the load. The microprocessor 18 can be programmed such that it operates as a regulator or as a controller.

We claim as our invention:

1. A system for driving a load element, comprising:

a drive motor on a drive shaft of the load element that establishes a drive rotation speed of the load element;

a rotation torque sensor on the drive shaft that emits a load torque signal proportional to a rotation torque;

a rotation torque influencing device that generates a supplementary torque when the load torque signal deviates from a desired load angle value present when a change has not occurred to a load created by the load element and acting on the drive motor, said supplementary torque being added to a drive torque generated by the drive motor such that a load angle of the drive motor remains substantially constant and uninfluenced by a change of the load;

the drive motor comprising a step motor whose motor shaft drives the drive shaft of the load element;

the rotation torque influencing device influencing a driving magnetic field for the motor shaft of the step motor such that a phase angle between a position of the motor shaft of the step motor and a magnetic field remains uninfluenced by the change of the load;

an activation frequency for motor currents of the step motor being controlled dependent on the load created by the load element; and the rotation torque influencing device generating clock signals dependent on the load change, said clock signals being supplied to the motor controller of the step motor, said step motor generating from the clock signals activation pulses for motor currents of the step motor.

2. A system according to claim 1 in which from the load torque signal of the rotation torque sensor and from a torque-phase angle characteristic line the rotation torque influencing device determines a phase angle change associated with the change of the load torque and, dependent on this, controls the clock signals for the activation frequency of the step motor such that the phase angle change caused by the load change is corrected.

3. A system according to claim 2 in which the step motor is arranged on the drive shaft for the load element, the rotation torque sensor is arranged between the step motor and the load element on the drive shaft and the respective load torque is determined as a measurement value, and the respective load torque is supplied as the measurement value to the rotation torque influencing device which determines the change of the load torque, and which from the torque-phase angle characteristic line, establishes the phase angle change associated with the change of the load, and controls the activation frequency of the step motor dependent on said phase angle change.

4. A system for driving a load element, comprising:

a drive motor on a drive shaft of the load element that establishes a drive rotation speed of the load element;

a rotation torque sensor on the drive shaft that emits a load torque signal proportional to a rotation torque;

a rotation torque influencing device that generates a supplementary torque when the load torque signal deviates from a desired load angle value present when a change has not occurred to a load created by the load element and acting on the drive motor, said supplementary torque being added to a drive torque generated by the drive motor such that a load angle of the drive motor remains substantially constant and uninfluenced by a change of the load;

the drive motor comprising a step motor whose motor shaft drives the drive shaft of the load element;

the rotation torque influencing device influencing a driving magnetic field for the motor shaft of the step motor such that a phase angle between a position of the motor shaft of the step motor and a magnetic field remains uninfluenced by the change of the load;

a rotation sensor which generates rotation sensor pulses dependent on the rotation movement of the drive shaft; and the rotation torque influencing device determining a real time between the rotation sensor pulse and compares said real time with a time without load changes which is a desired time, and regulating an activation frequency of the step motor with a comparison result such that a phase angle change caused by the load change is corrected.

5. A system according to claim 4 in which the rotation sensor is arranged on the drive shaft for the load element, and the rotation sensor transfers the rotation sensor pulses to the rotation torque influencing device that measures the time between the rotation sensor pulses and subtracts this time from a desired time and regulates the step motor with a difference value.

6. A system for driving a load element, comprising:

a drive motor on a drive shaft of the load element that establishes a drive rotation speed of the load element;

a rotation torque sensor on the drive shaft that emits a load torque signal proportional to a rotation torque;

a rotation torque influencing device that generates a supplementary torque when the load torque signal deviates from a desired load angle value present when a change has not occurred to a load created by the load element and acting on the drive motor, said supplementary torque being added to a drive torque generated by the drive motor such that a load angle of the drive motor remains substantially constant and uninfluenced by a change of the load;

the drive motor comprising a step motor whose motor shaft drives the drive shaft of the load element; and the rotation torque influencing device comprising a microprocessor arranged before a motor controller for the step motor, and to which microprocessor the measurement signals are supplied; the microprocessor generating clock signals from the measurement signals; and the microprocessor transferring the clock signals to the motor controller which adjusts activation pulses for motor currents of the step motor such that a phase angle change incurred by the load change is corrected.

7. A system according to claim 6 in which the microprocessor exhibits a function of a PID regulator.

8. A system according to claim 6 in which the load element comprises a belt driven by the drive motor and deflected by a further axle.

9. An electrographic printing or copying device, comprising:

an image carrier with generated and developed charge images to be printed, the developed images being transferred onto a transfer belt for transfer-printing onto a recording medium; and a system which drives the transfer belt, said system comprising a drive motor on a drive shaft of the transfer belt that establishes a drive rotation speed of the transfer belt, a rotation torque sensor on the drive shaft that emits a load torque signal proportional to a rotation torque, and a rotation torque influencing device that generates a supplementary torque when the load torque signal deviates from a desired load angle value present when a change has not occurred to a load created by the transfer belt and acting on the drive motor, said supplementary torque being added to a drive torque generated by the drive motor such that a load angle of the drive motor remains substantially constant and uninfluenced by a change of the load.

10. An electrographic printing or copying device according to claim 9 in which the rotation torque influencing device comprises at least one of a supplementary motor, a step motor, or a brake, and wherein said rotation torque influencing device is arranged on a shaft of the transfer belt arranged at a transfer printing point between the recording medium and the transfer belt.

11. A method for driving a transfer belt of an electrographic printing or copying device, comprising the steps of:

with a drive motor arranged on a drive shaft of the transfer belt, establishing a drive rotation speed of the transfer belt, the drive motor comprising a step motor whose motor shaft drives the drive shaft of the transfer belt as a load element;

emitting from a rotation torque sensor on the drive shaft a load torque signal proportional to a rotation torque;

generating a supplementary torque with a rotation torque influencing device when the load torque signal deviates from a desired load angle present when a change has not occurred to a load created by the transfer belt acting on the drive motor, and adding said supplementary torque to a drive torque generated by the drive motor such that a load angle of the drive motor remains substantially constant and uninfluenced by a change of the load;

with the rotation torque influencing device influencing a driving magnetic field for the motor shaft of the step motor such that a phase angle between a position of the motor shaft of the step motor and a magnetic field remains uninfluenced by a change of the load;

controlling an activation frequency for motor currents of the step motor dependent on the load created by the load element; and with the rotation torque influencing device generating clock signals dependent on the load change, said clock signals being supplied to the motor controller of the step motor, said step motor generating from the clock signals activation pulses for motor currents of the step motor.

12. A method for driving a transfer belt of an electrographic printing or copying device, comprising the steps of:

with a drive motor arranged on a drive shaft of the transfer belt, establishing a drive rotation speed of the transfer belt, the drive motor comprising a step motor whose motor shaft drives the drive shaft of the transfer belt as a load element;

emitting from a rotation torque sensor on the drive shaft a load torque signal proportional to a rotation torque;

generating a supplementary torque with a rotation torque influencing device when the load torque signal deviates from a desired load angle present when a change has not occurred to a load created by the transfer belt acting on the drive motor, and adding said supplementary torque to a drive torque generated by the drive motor such that a load angle of the drive motor remains substantially constant and uninfluenced by a change of the load;

with the rotation torque influencing device influencing a driving magnetic field for the motor shaft of the step motor such that a phase angle between a position of the motor shaft of the step motor and a magnetic field remains uninfluenced by the change of the load;

with a rotation sensor generating rotation sensor pulses dependent on the rotation movement of the drive shaft; and with the rotation torque influencing device determining a real time between the rotation sensor pulse and compares said real time with a time without load changes which is a desired time, and regulating an activation frequency of the step motor with a comparison result such that a phase angle change caused by the load change is corrected.

13. A method for driving a transfer belt of an electrographic printing or copying device, comprising the steps of:

with a drive motor arranged on a drive shaft of the transfer belt, establishing a drive rotation speed of the transfer belt, the drive motor comprising a step motor whose motor shaft drives the drive shaft of the transfer belt as a load element;

emitting from a rotation torque sensor on the drive shaft a load torque signal proportional to a rotation torque;

generating a supplementary torque with a rotation torque influencing device when the load torque signal deviates from a desired load angle present when a change has not occurred to a load created by the transfer belt acting on the drive motor, and adding said supplementary torque to a drive torque generated by the drive motor such that a load angle of the drive motor remains substantially constant and uninfluenced by a change of the load; and providing the rotation torque influencing device as a microprocessor arranged before a motor controller for the step motor, and supplying to the microprocessor measurement signals, the microprocessor generating clock signals from the measurement signals, and the microprocessor transferring the clock signals to the motor controller which adjusts activation pulses for motor currents of the step motor such that a phase angle change incurred by the load change is corrected.

* * * * *